(12) United States Patent
Burns et al.

(10) Patent No.: US 7,212,376 B2
(45) Date of Patent: May 1, 2007

(54) DISK DRIVE SYSTEM WITH HYDRODYNAMIC BEARING LUBRICANT HAVING CHARGE-CONTROL ADDITIVE COMPRISING DIOCTYLDIPHENYLAMINE AND/OR OLIGOMER THEREOF

(75) Inventors: John M. Burns, Morgan Hill, CA (US); Ta-Chang Fu, San Jose, CA (US); Andrew K. Hanlon, San Jose, CA (US); Charles Hignite, San Jose, CA (US); Thomas E. Karis, Aromas, CA (US); Richard M. Kroeker, Morgan Hill, CA (US); Stanley Y. Wong, San Jose, CA (US)

(73) Assignee: Hitachi Global Storage Netherlands, B.V., Amsterdam (NL)

( * ) Notice: Subject to any disclaimer, the term of this patent is extended or adjusted under 35 U.S.C. 154(b) by 505 days.

(21) Appl. No.: 10/672,431

(22) Filed: Sep. 26, 2003

(65) Prior Publication Data
US 2005/0068667 A1 Mar. 31, 2005

(51) Int. Cl.
*G11B 19/20* (2006.01)
(52) U.S. Cl. .................. 360/99.08; 360/98.07
(58) Field of Classification Search ............. 360/99.08, 360/98.07, 99.04
See application file for complete search history.

(56) References Cited

U.S. PATENT DOCUMENTS

| | | | |
|---|---|---|---|
| 4,604,222 A | 8/1986 | Borduz et al. | |
| 4,892,418 A | 1/1990 | Asada et al. | |
| 5,358,339 A | 10/1994 | Konno et al. | |
| 5,641,841 A | 6/1997 | Diaz et al. | |
| 5,744,431 A | 4/1998 | Diaz et al. | |
| 5,773,394 A | 6/1998 | Wan et al. | |
| 5,886,854 A | 3/1999 | Diaz et al. | |
| 5,907,456 A | 5/1999 | Khan et al. | |
| 5,930,075 A * | 7/1999 | Khan et al. | 360/99.08 |
| 5,940,246 A | 8/1999 | Khan et al. | |
| 5,940,247 A * | 8/1999 | Karis et al. | 360/99.08 |
| 6,194,360 B1 * | 2/2001 | Karis et al. | 360/99.08 |
| 6,250,808 B1 | 6/2001 | Ichiyama | |
| 6,335,310 B1 | 1/2002 | Suekuni et al. | |

FOREIGN PATENT DOCUMENTS

| | | |
|---|---|---|
| JP | 03-060349 | 3/1991 |
| JP | 06-248287 | 9/1994 |
| JP | 2001-208069 | 8/2001 |

* cited by examiner

*Primary Examiner*—Craig A. Renner
(74) *Attorney, Agent, or Firm*—Mintz, Levin, Cohn, Ferris, Glovsky and Popeo, P.C.; Isaac M. Rutenberg

(57) ABSTRACT

An improved disk drive system that employs a lubricant with improved charge control is provided. The disk drive system is comprised of a rotatably mounted magnetic disk. A rotor is coupled to the disk and rotatably retained by a stator. A bearing is formed that serves as an interface between the stator and the rotor. A motor coupled to the rotor rotates the magnetic disk via the rotor. Located in the bearing is a lubricant having a low relative electrical permittivity.

15 Claims, 7 Drawing Sheets

DISK DRIVE SYSTEM WITH HYDRODYNAMIC BEARING LUBRICANT HAVING CHARGE-CONTROL ADDITIVE COMPRISING DIOCTYLDIPHENYLAMINE AND/OR OLIGOMER THEREOF

TECHNICAL FIELD

The invention relates generally to disk drive systems that employ a lubricant having a low relative electrical permittivity. The invention also relates to the use of a charge-control additive to reduce the electrical charge of a lubricant.

BACKGROUND

Computer disk drives, e.g., hard disk drives, use a motor to turn at least one magnetic disk at high speeds. Typically, the magnetic disk is coupled to a rotor, which, in turn, is coupled to the motor for rotating the magnetic disk via the rotor. A stator is also provided to retain the rotor. A bearing serves as an interface between the stator and the rotor. During operation, lubricant is typically required and may be provided in the bearing. For example, the bearing may include a pair of magnetic fluid seals, several capillary holes or channels, and a lubricant flowing within the capillary channels that is held in place by a barrier film.

Disk drive systems also include at least one read/write transducer or "head" that serves to read and write data to the magnetic disk. The transducer may be supported by an air-bearing slider that has a top surface attached to an actuator assembly via a suspension and a bottom surface having an air-bearing design of a desired configuration to provide favorable flying height characteristics. As a disk begins to rotate, air enters the leading edge of the slider and flows in the direction of the trailing edge of the slider. The flow of air generates a positive pressure on the air-bearing surface of the slider to lift the slider above the recording surface. As the spindle motor reaches the operating velocity, the slider is maintained at a nominal flying height over the recording surface by a cushion of air. Then, as the spindle motor spins down, the flying height of the slider drops.

A problem common to many disk drive systems relates to the tendency of the system to accumulate static charge. Such charge may build up, uncontrollably discharge, and damage various components of the disk drive. For example, a voltage difference between the heads and disks can provide a potential energy discharge that can harm the heads and the disk media itself. Although the initial voltage differences between components of a disk drive system can be kept to near zero, static charging typically accumulates in a disk drive system during operation, thereby building up voltage differences between components of the disk drive system. Such voltage differences occur between moving parts such as between the head and the disk and/or between the rotor and the stator.

A number of sources may contribute to static charge accumulation. When surfaces rub against each other in a bearing, electron and ion exchange or charge separation may occur, thereby resulting in tribocharging. Even occasional contact of asperities on the heads and disks can generate tribocharge. Due to the close proximity of surfaces in a disk drive platter, even a small charge imbalance forms potential differences on the order of volts. In addition, charge accumulation may occur because of shearing of air molecules in the boundary layer adjacent to rotating surfaces. Charging also occurs due to shear flow of the motor bearing lubricant. Furthermore, lubricant used in the bearing may be dielectric in nature. Dielectric lubricants generally lack the capability to allow for dissipation of accumulated charge. Because shear forces may break chemical bonds in the lubricant, liberated electrons and ions may further contribute to charge accumulation.

One known approach to alleviate excess static charging is to provide a lubricant that has a sufficiently high electrical conductivity to dissipate charge accumulated in a disk drive charge. A number of patents describe additives for increasing the electrical conductivity of a lubricant. For example, U.S. Pat. Nos. 5,641,841, 5,744,431, and 5,886,854, each to Diaz et al., describe various conducting polyaniline derivatives that may be used to render a lubricant conductive. Additional patents that describe conductive lubricants include, U.S. Pat. No. 5,773,394 to Wan et al., U.S. Pat. No. 5,940,246 to Khan et al., and U.S. Pat. No. 6,250,808 to Ichiyama. It is thought that highly conductive lubricants in the bearing would reduce any potential difference that may build up between a rotor and a stator.

Nevertheless, it has been found that lubricant conductivity represents only one of many factors that influences the static charging behavior of disk drive systems. In particular, it has been discovered that disk drives that employ highly conductive lubricants may nevertheless experience a surprisingly high peak discharge current because the lubricants themselves may accumulate excessive static charge. Accordingly, there is a need for a disk drive lubricant that is not prone to accumulating excessive static charge. Such lubricants typically have a low relative electrical permittivity and may be formulated, for example, by introducing a charge-control additive for reducing charge accumulation into an ordinary lubricating medium.

SUMMARY OF THE INVENTION

One aspect of the invention pertains to a disk drive system that employs a lubricant containing lubricating medium and a charge-control additive for reducing charge accumulation.

Another aspect of the invention pertains to a disk drive system that employs a lubricant having a relative electrical permittivity no greater than about 25,000 at 50° C.

Additional aspects, advantages, and novel features of the invention will be set forth in part in the description that follows, and in part will become apparent to those skilled in the art upon examination of the following, or may be learned by practice of the invention through routine experimentation.

In a first embodiment, the invention provides a disk drive system. A rotatably mounted magnetic disk is coupled to a rotor, which is rotatably retained by a stator. A bearing is formed that serves as an interface between the stator and the rotor. A motor coupled to the rotor is provided for rotating the magnetic disk via the rotor. Located in the bearing is a lubricant having a low relative electrical permittivity.

In another embodiment, the invention provides a disk drive system similar to the above disk drive system except that the system is prone to experience electrostatic discharge between a magnetic disk and a slider in operative association with the magnetic disk. Like the above system, the disk is coupled to a rotor, which, in turn, is coupled to a motor. A stator for rotatably retaining the rotor is also provided. By replacing the lubricant in the bearing with one that has lower relative electrical permittivity, electrostatic discharge is reduced. For example, peak electrostatic discharge between the magnetic disk and the slider may be reduced from at least about 200 nA to no more than about 50 nA.

The lubricant typically has a DC relative electrical permittivity no greater than about 25,000 at 50° C. Preferably, the DC relative electrical permittivity is no greater than about 10,000 at 50° C. Low relative electrical permittivity may be achieved by formulating the lubricant to include a lubricating medium and a charge-control additive for reducing charge accumulation in the bearing. For example, the lubricating medium may be comprised of an oil, and the charge-control additive may be solubilized or dissolved in the lubricating medium. Exemplary charge-control additives include aromatic amines, alkylated aromatic amines, oligomers thereof, and combinations thereof. More specifically, preferred charge-control additives include dioctylediphenylamine, phenylnaphthylamine, oligomers thereof, or combinations of the foregoing. A particularly preferred charge-control additive is comprised of an oligomer of phenylnaphthylamine and dioctylediphenylamine.

In addition, the lubricant may further comprise a conductivity-enhancing additive solubilized or dissolved in the lubricating medium. For example, the conductivity-enhancing additive may be comprised of an aniline, an oligomer thereof, a polymer thereof, or a combination of the foregoing.

BRIEF DESCRIPTION OF THE FIGURES

FIG. 4A is a graph that plots loss factor as a function of frequency. FIG. 4B is a graph that plots relative electrical permittivity as a function of frequency.

DETAILED DESCRIPTION OF THE INVENTION

Definitions and Overview

Before describing the present invention in detail, it is to be understood that this invention is not limited to processing conditions, manufacturing equipment, or the like, as such may vary. It is also to be understood that the terminology used herein is for describing particular embodiments only and is not intended to be limiting.

It must be noted that, as used in the specification and the appended claims, the singular forms "a," "an" and "the" include plural referents unless the context clearly dictates otherwise. Thus, for example, reference to "a disk" includes a single disk as well as a plurality of disks, reference to an "additive" includes a single additive as well as a plurality of additives, reference to "an oligomer" includes a single oligomer as well as a plurality of oligomers, and the like.

In describing and claiming the present invention, the following terminology is used in accordance with the definitions set out below.

The term "lubricant" is used in its ordinary sense and refers to a substance that reduces friction when applied between surfaces. A lubricant used in conjunction with the invention is generally a fluid that contains a liquid and optionally a solid or a gas that is minimally, partially, or fully solvated, dispersed, or suspended in the liquid. For example, a lubricant may include an oil-based lubricating medium and optionally monomeric, oligomeric, and/or polymeric additives solvated therein.

"Optional" or "optionally" means that the subsequently described circumstance may or may not occur, so that the description includes instances where the circumstance occurs and instances where it does not.

The term "relative electrical permittivity," is used in its ordinary sense and refers to a measure of the ability of a material, e.g., a lubricant, to store a charge from an applied electric field without conducting electricity. Also sometimes referred to in the art as "dielectric constant," the "relative electrical permittivity" of a material is a dimensionless scalar quantity greater than 1 that, when multiplied with the permittivity of free space, yields the absolute permittivity of the material.

The terms "rotor," "stator," and "bearing" are used herein to refer to a rotating part, a stationary part, and the interface between the parts, respectively, of an electrical and/or mechanical device. Typically, the rotor is rotated about or within the stator. For example, a spindle shaft may serve as a rotor that rotates within a spindle sleeve that serves as a stator that circumscribingly retains the rotor.

The term "slider" is used in its ordinary sense and refers to a component of a disk drive system that supports a read/write transducer or "head," and that has an air-bearing surface to provide favorable flying height characteristics. The term "slider" also generally includes any portion of the head assembly through which discharge current may travel.

Figure 1:
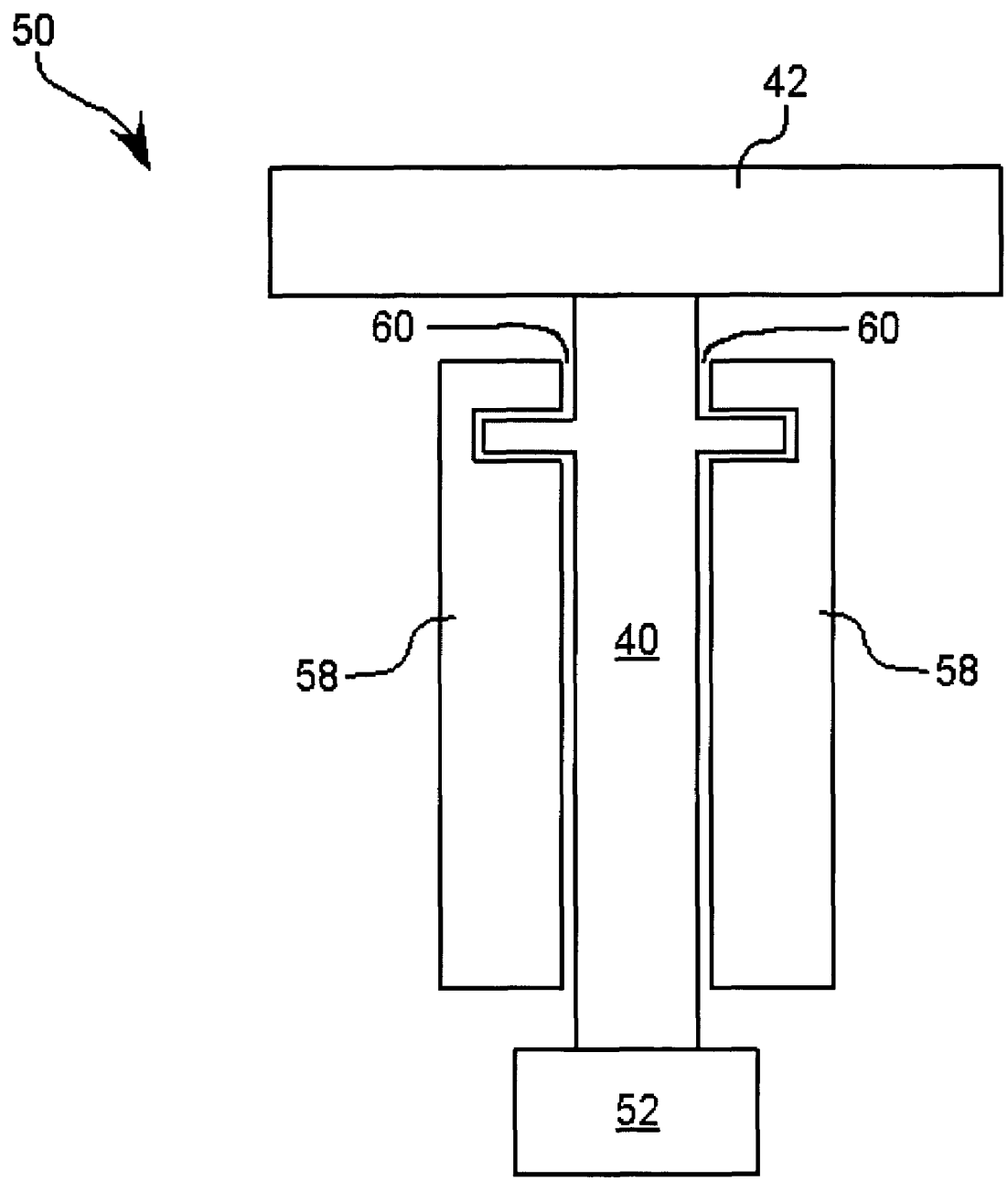
FIG. 1 schematically illustrates in cross-sectional view a simplified disk drive spindle for use with the invention.

Generally, the invention relates to a lubricant for use in a disk drive system. In order to elucidate the invention fully, a simplified spindle assembly for a disk drive having a single magnetic disk is illustrated in FIG. 1. As with all figures referenced herein, in which like parts are referenced by like numerals, FIG. 1 is not to scale, and certain dimensions may be exaggerated for clarity of presentation. The spindle assembly 50 includes a rotor 40 in the form of an axially symmetric rod disposed within an elongated bore of a stator 58. The rotor 40 is capable of rotating about its central axis and is retained by the stator 58 within the bore. Bearing 60 is formed as an interface between the rotor 40 and the stator 58. Depending on the particular design of the spindle assembly, the bearing may exhibit any of a number of different structures. For example, the bearing may be a journal bearing, thrust bearing, spiral groove bearing or a herringbone groove bearing. In addition, the bearing may be formed from surfaces that are embossed with grooves to create an internal pressure within the lubricant.

In any case, a lubricant is disposed within the bearing 60. In high performance drives, the bearing may contain a lubricant layer of no more than about 10 micrometers in thickness. Affixed to the lower terminus of the rotor 40 is a motor 52. A single magnetic disk 42 is centrally attached to the upper terminus of the rotor 40. During operation, motor 52 rotates the disk 42, and the lubricant serves to facilitate free rotation of rotor 40 with respect to stator 58.

Upon examination of FIG. 1, it should be apparent that a lubricant having undesirable electrostatic properties placed in the bearing 60 may serve to isolate rotor 40 electrically from stator 58. As a result, the rotor 40 and stator 58 may exhibit different electrical potentials. Since the magnetic disk 42 is depicted in electrical connection to rotor, the disk 42 may be at substantially the same potential as the rotor. Thus, if a component of the disk drive system in electrical contact with the stator 58 is brought in close proximity to the disk 42, uncontrolled electrostatic discharge may take place between the disk and the proximate component, thereby damaging the disk 42.

Figure 2:
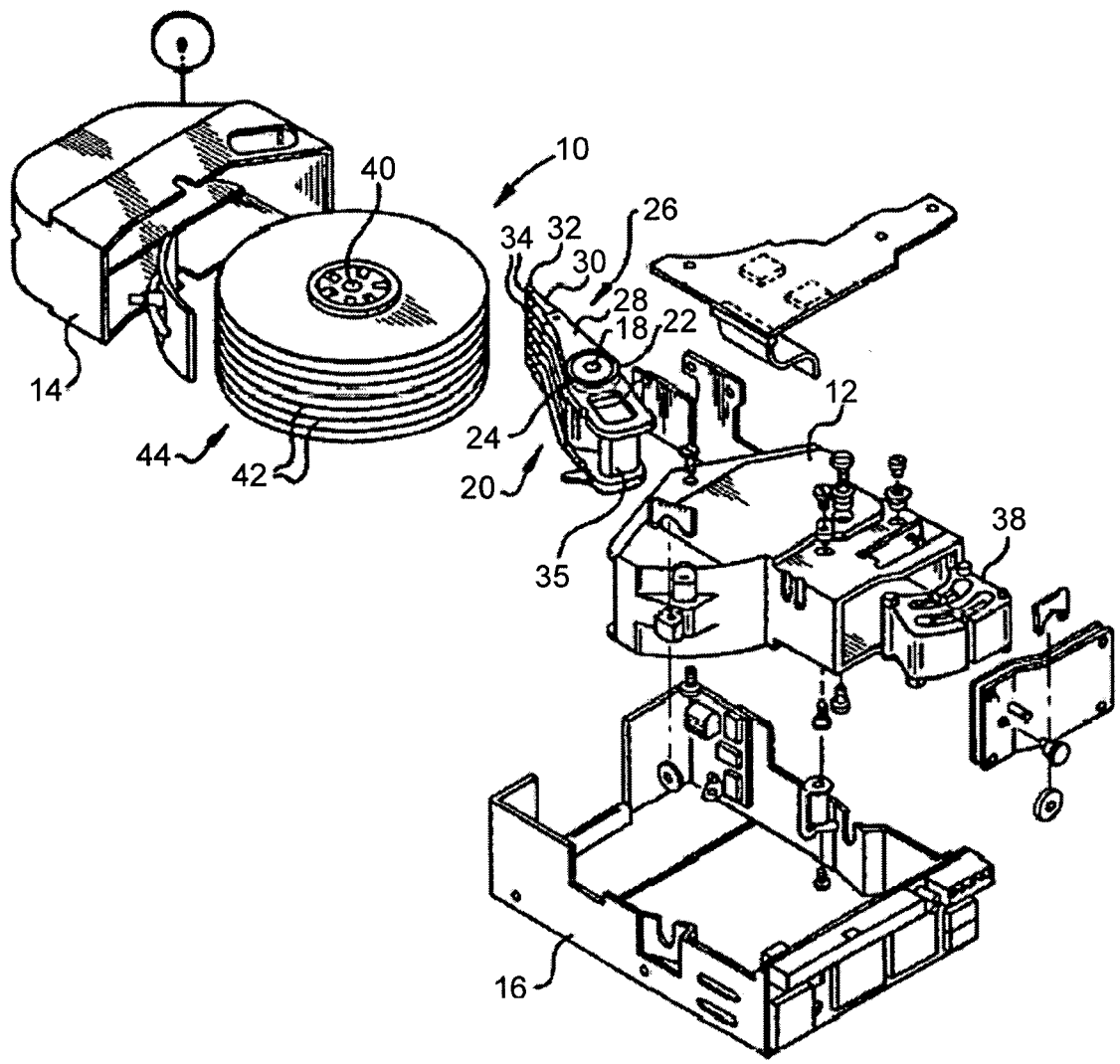
FIG. 2 is an exploded view of an exemplary disk drive system for use with the invention.

FIG. 2 depicts in detail and in exploded view a typical disk drive system or disk drive 10. The disk drive 10 includes a housing 12, and a housing cover 14. When the disk drive is assembled, the housing cover is mounted within a frame 16. Rotatably attached within the housing 12 on an actuator shaft 18 is an actuator assembly 20. One end of the actuator assembly 20 includes an e-block or actuator rotor 22 having a plurality of radially extending actuator arms 24. Attached to the separate actuator arms 24 of rotor 22 are head gimbal assemblies 26. Each head gimbal assembly 26 includes a mounting plate 28 attached to actuator arm 24. Attached to the end of the mounting plate 28 are one or two beams 30. Attached at the end of each load beam 30 is a slider 32, which carries a pair of magnetic transducers or read/write head 34. On the other end of the actuator assembly 20, opposite the load beams 30 and the sliders 32 is a rotating means for rotating rotor 22. The rotating means is shown as a voice coil 35, which is attached to actuator rotor 22 and magnet 38, which are attached in housing 12. The magnet 38 and the voice coil 35 are the key parts of a voice coil motor that applies a force to the actuator assembly 20 to rotate it about the actuator shaft 18.

Mounted within housing 12 is a rotor in the form of a spindle shaft 40. Rotatably attached to spindle shaft 40 are a number of vertically spaced apart magnetic disks 42. The vertically spaced apart and aligned magnetic disks 42 define a disk stack 44. An internal motor 52 (shown in FIG. 3) rotates the disks 42. The disk drive assembly 10 also has control circuitry for controlling the motor and the voice coil motor to allow selective positioning of the read/write heads 34 over the disks 42.

Figure 3:
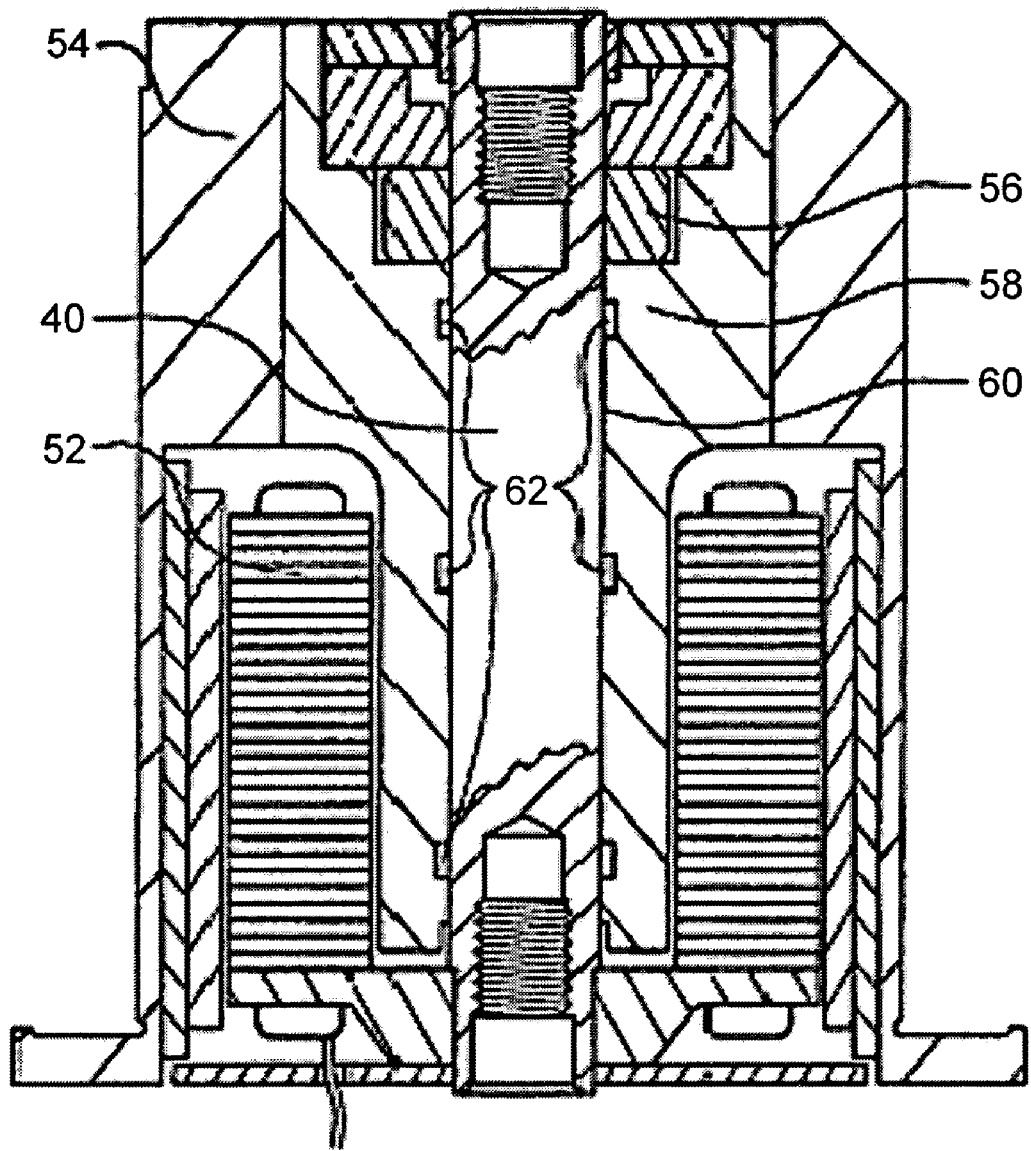
FIG. 3 is a cross-sectional view of an exemplary disk drive spindle-motor assembly according to the present invention.

FIG. 3 details the part of the disk stack drive assembly comprising the internal motor 52 and spindle shaft 40. The drive motor 52 is encased in hub 54. A thrust bearing 56 fits over the spindle shaft 40 to provide axial load support and stiffness. The spindle shaft 40 further fits within a stator in the form of a spindle sleeve 58, which further encases motor 52. During operation, drive motor 52 causes the spindle shaft 40 to rotate at an extremely high rate. For example, the spindle shaft may be rotated at a rate of at least about 3,600 revolutions per minute (RPM). In some instances, at least about 15,000 to 20,000 or more revolutions per minute may be achieved. As a result, a lubricant is needed to allow free rotation of shaft 40 with respect to sleeve 58. Accordingly, a journal bearing 60 is provided in which a lubricant emanates from lubricating capillaries 62 and provides lubrication in the journal bearing 60 to reduce friction between shaft 40 and sleeve 58.

From FIGS. 2 and 3, it should be apparent that sliders 32 may be electrically connected to the spindle sleeve 58. In addition, magnetic disks 42 may be electrically connected to the spindle shaft. Since sliders 32 must be positioned in proximity to disks 42 while the disk are spinning for operability, any potential difference between the spindle shaft 40 and spindle sleeve 58 may result in uncontrolled electrostatic discharge.

The invention thus overcomes the problems associated with known disk drive lubricants. While the high-end server disk drive industry is migrating from ball bearing to fluid bearing spindle motors, the gap between the magnetic recording slider and the disk is decreasing from over 10 to 5 nm, or less. Accordingly, small electrical potential across the fluid bearing translates into a high electric field across the air gap. As discussed below, experimental results show that, given lubricants having the same electrical conductivity, those having a low relative electrical permittivity are preferred over those having a high relative electrical permittivity in the context of reducing unwanted electrostatic discharge in disk drives.

The lubricant typically has a DC relative electrical permittivity no greater than about 25,000 at 50° C. Preferably, the DC relative electrical permittivity is no greater than about 10,000 at 50° C. Low relative electrical permittivity may be achieved by formulating the lubricant to include at least a lubricating medium and a charge-control additive for reducing charge accumulation in the bearing.

For example, an oil having a desired viscosity may serve as a lubricating medium. Compounds suitable as a lubricating medium include, for example, perfluoropolyethers, esters, synthetic hydrocarbons and hydrocarbons. In addition, diesters, polyol esters and polyalphaolefins may be used as well. In some instances, a single compound may exhibit the appropriate viscosity. However, a blend of different base fluids may be advantageously used in other situations.

The charge-control additive may be solubilized or dissolved in the lubricating medium. Exemplary charge-control additives include aromatic amines, alkylated aromatic amines, oligomers thereof, and combinations thereof. More specifically, preferred charge-control additives include dioctyldiphenylamine, phenylnaphthylamine, oligomers thereof, or combinations of the forgoing. A particularly preferred charge-control additive is comprised of an oligomer of phenylnaphthylamine and dioctylediphenylamine.

In addition, the lubricant may further comprise a conductivity-enhancing additive solubilized or dissolved in the lubricating medium. For example, the conductivity-enhancing additive may be comprised of an aniline, an oligomer thereof, a polymer thereof, or a combination of the forgoing. Such conductivity-enhancing additives are known in the art, examples of which are listed in U.S. Pat. Nos. 5,641,841, 5,744,431, and 5,886,854, each to Diaz et al.

The following example is put forth so as to provide those of ordinary skill in the art with a complete disclosure and description of how to implement the invention, and are not intended to limit the scope of what the inventors regard as their invention.

EXAMPLE

To determine the performance capabilities of various lubricants in such improved disk drives, various lubricant formulations were prepared for experimental evaluation. In particular, the dielectric properties of the lubricants were characterized. Motors were built with these formulations, and the motor running voltage and peak discharge current were measured. A series RC equivalent circuit model was developed to relate the dielectric properties of the lubricants to the peak discharge current and the electric energy associated with the charge accumulated in the bearing.

All lubricant formulations were made from a lubricating medium comprised of a base oil with one or more additives. The base oil used was neopentyl glycol dicaprate (NPG). NPG is also known as 2,2-dimethyl-1,3-propanediyl didecanoate (CAS 27841-06-1). Depending on lot, trace amounts of butylated hydroxy toluene (BHT) stabilizer were detected by nuclear magnetic resonance (NMR) spectroscopy. Formulation Oil S was prepared containing approximately 0.5 wt % of a commercial conductivity additive sold under the trademark of STADIS® 450 from Octel-Starreon LLC (Littleton, Colo.). Formulations referred to as Oil V were prepared containing an oligomeric antioxidant sold under the trademark VANLUBE® 9317 comprising a 50 wt % reaction mixture of dioctyl diphenyl amine and phenyl naphthyl amine in a tetraester oil carrier from R.T. Vanderbilt Company, Inc. (Norwalk, Conn.). Variations of Formulation Oil V were prepared as Lot 1, Lot 2, Batch Amber, and Batch Red.

Additional additives were also incorporated in the base oil for evaluation. These additional additives include: a dialkyl diphenyl amine sold under the trademark IRGANOX® L57 from Ciba Specialty Chemicals (Tarrytown, N.Y.); commercial reagent grade BHT; and commercial reagent grade benzotriazole (BTA); and the emeraldine form of oligomeric polyaniline with an unsubstituted phenyl ring and R=CH$_3$ (OAN). These additives were included in Oils A, B, and C. The additive levels in Oils A, B, and C were between 0.1 and 1 wt %. Oil A contained a para alkyl ester substituted BHT that is similar to IRGANOX® 1076 or L135 from Ciba Specialty Chemicals and a secondary aromatic amine resembling dioctyl diphenyl amine that is similar to IRGANOX® L57 from Ciba Specialty Chemicals. Oil B contained Oil A with the addition of an alkylated BTA that resembles item BT-LX from Johoku Chemicals, Co. Ltd (Tokyo, Japan). Oil C contained Oil B with a higher level of the aromatic amine.

Additives were mixed into the base oil with a combination of stirring, sonication, and mild heating with a heat gun. Stirring was either by shaking or with a Vortex mixer. The conducting form of OAN was obtained by neutralizing with 0.01 mole of dodecylbenzene sulfonic acid to 2 grams of emeraldine base. For the purpose of experimental evaluation, the insoluble portion of the resulting OAN was filtered out after mixing using an Pall Gelman Laboratory Acrodisc CR 25 mm Syringe filter with 1 micron polytetrafluoroethylene membrane (P/N 4226 from VWR Scientific, 28143-928).

Fluid bearing disk drive spindle motors were prepared with some of the above-discussed lubricants. These motors were of the fixed stator type used in high-end server magnetic recording disk drives.

Oil Permittivity Measurements

The dielectric properties (relative permittivity and the loss factor) were measured using the TA Instruments Dielectric Analyzer (DEA) model 2970 with ceramic single surface sensors at 50° C. for 1 hour in nitrogen. Each sensor contained gold electrodes that were 125 micrometers wide and 12.5 micrometer thick. The electrodes were spaced 1 mm apart. Each sensor was measured to calibrate the linear variable transducer, to zero the force transducer and to determine the sensor response (geometry and resistance temperature detection).

Each sample was spread onto a sensor's surface, and the sensor was positioned at the bottom of the oven. Ram pressure causes the sample to embed on the sensor surface. This compels the fluid to flow into the spaces between the electrodes. Spring-loaded electrical probes that are attached to the ram make contact with the sensor pads so as to complete the signal circuit.

Nominally, the DEA measurements were done at isothermal temperatures of 50° C. and 80° C. At each temperature, six sinusoidal oscillation frequency sweeps were performed between 0.1 and 10,000 Hz, with 5 points per decade. Multiple frequency sweeps were done to verify the stability of the measurement. Data from the second complete frequency sweep was selected for further analysis.

When DEA measurements were performed at several different temperatures, time temperature superposition was employed to extend the frequency range of the measurements by shifting along the frequency axis, relative to the 50° C. data (time-temperature superposition).

Figure 4:
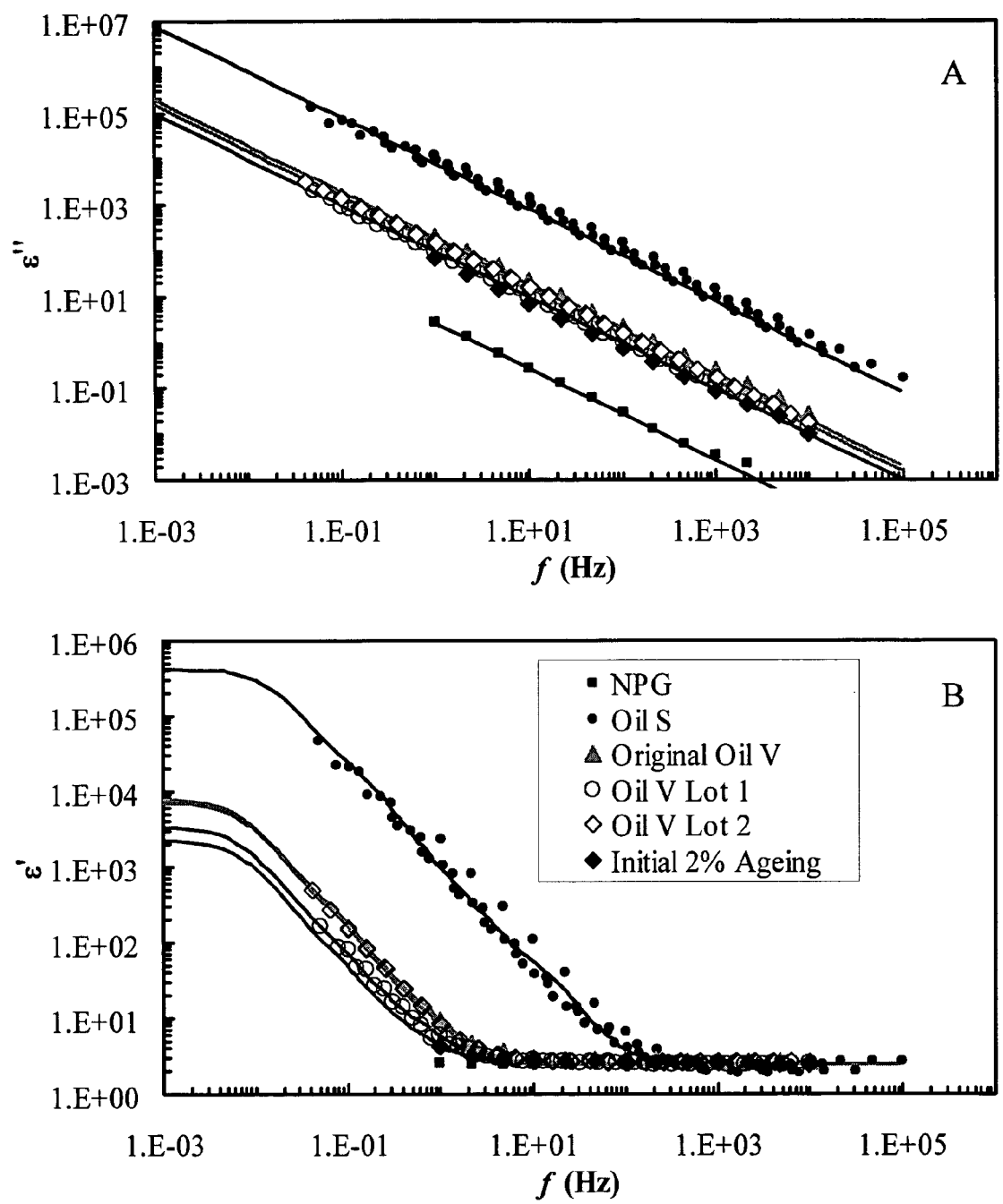
FIGS. 4A and 4B, collectively referred to as FIG. 4, are graphs that illustrate the dielectric properties of various lubricant formulations.

The oil specific conductivity was usually derived from the loss factor data, some of which is shown in FIG. 4A, by fitting with the limiting low frequency form of the loss factor equation:

$$\varepsilon'' = \frac{\sigma}{2\pi\varepsilon_0 f},$$

where $\epsilon''$ is the loss factor, $\sigma$ is the specific conductivity, $\epsilon_o$ is the absolute permittivity of free space, and f is the excitation frequency. In some cases, single point values of conductivity were also calculated from the loss factor measured at 1 Hz, which is nearly the same as the specific conductivity calculated from the fit to the data over the whole range of frequency.

The electric charge in the oil is derived from the relative permittivity. Typical values of the relative permittivity, $\epsilon'$, as a function of frequency are shown in FIG. 4B. The smooth curves are from a manual fit to a discrete relaxation time series with four relaxation times, wherein:

$$\varepsilon' = \varepsilon_u + \sum_i \frac{\varepsilon_{r,i} - \varepsilon_u}{1 + (2\pi \tau_i f)^2}.$$

Here, $\epsilon_u$ is the high frequency relative permittivity (often called the dielectric constant), and is about 2 for non-polar hydrocarbons such as n-dodecane, $\epsilon_{r,i}$ is the $i^{th}$ relaxation magnitude, and $\tau_i$ is the $i^{th}$ relaxation time. Three relaxation times were sufficient to fit the relative permittivity data for the formulated oils, as shown by the smooth curves through the data points in FIG. 4B.

The DC relative permittivity is essentially the point where the smooth curves interest the vertical axis in FIG. 4B. At steady state motor voltage, electrical charge stored in the bulk of the fluid bearing oil is proportional to the dc relative permittivity:

$$\varepsilon'(0) = \sum_i \varepsilon_{r,i}.$$

Figure 5:
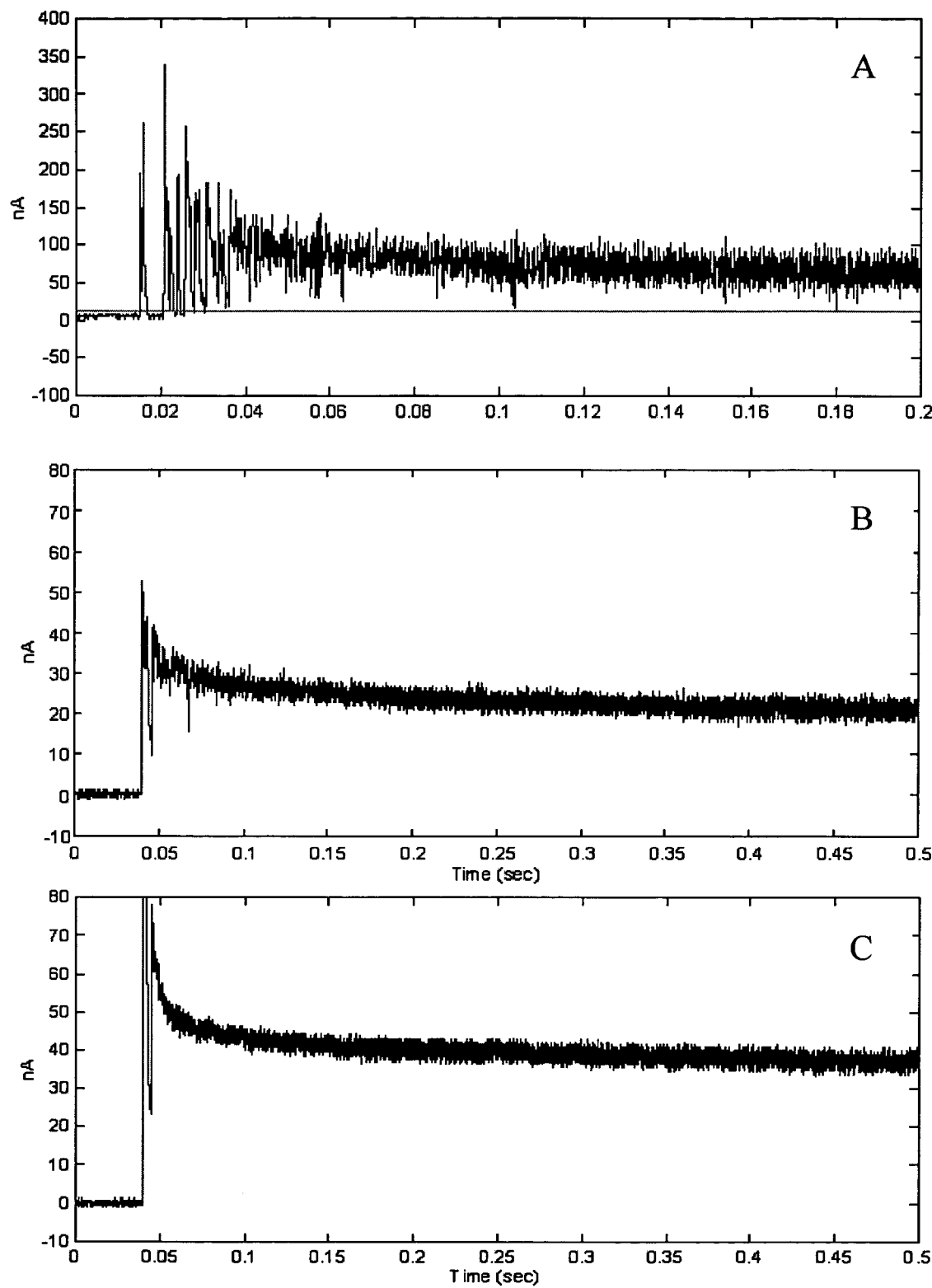
FIGS. 5A–5C, collectively referred to as FIG. 5, illustrate the typical discharge current measured for fluid bearing motors capable of rotating at 15,000 revolutions per minute (15 kRPM) made with three different oils A, NPG base oil, B, Oil V, and C, Oil C.

Test stands were set up to measure the steady state voltage and peak discharge current on disk drive spindle motors while they were spinning at 10 or 15 kRPM. The stator was mounted onto a conducting metal base. Electrical contact was made to the spinning rotor with a conductive fiber brush or a small wire. Measurements were performed with a high impedance electrometer (Keithley model 617). For running voltage measurements, the voltage reading was taken while contacting the motor hub, with the stator as ground. For peak discharge current, the electrometer was set to current sensing mode. The analog voltage output from the electrometer was acquired by a personal computer with an analog-to-digital converter card for analysis. The highest current during the initial discharge transient when contact was made between the stator and the hub was recorded as the peak discharge current. Typical plots of the discharge current transient are shown in FIG. 5. Running voltages, $v_o$, and peak discharge current, $i_p$, are the average values of measurements on at least five motors.

Figure 7:
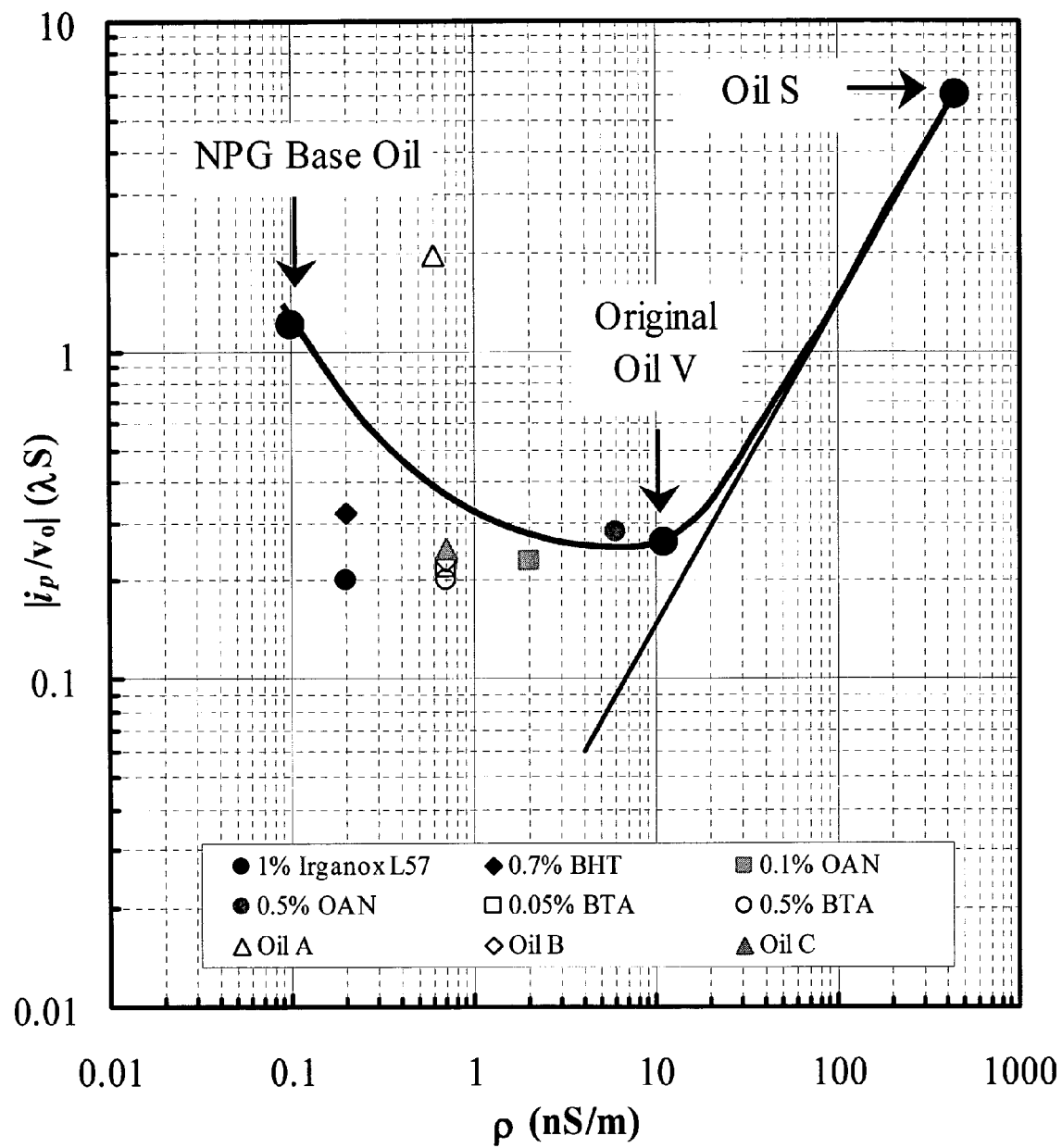
FIG. 7 is a graph that plots peak motor discharge conductance versus oil-specific conductivity measurement for 15 kRPM fluid dynamic bearing motors with various oil formulations. The smooth curve is drawn through the data points. The line is from a fit of the RC model to the Oil S data point.

The dielectric loss factor and relative permittivity for various lubricants are shown in FIG. 7. There are orders of magnitude difference between the NPG base oil, the Oil V containing 2% VANLUBE® 9317, and Oil S (containing STADIS-450). The specific conductivity, relative permittivity at 1 Hz, $\epsilon'(1\ Hz)$, and dc relative permittivity, $\epsilon'(0)$, for these lubricants were measured at 50° C. and listed in Table 1.

TABLE 1

| Oil | $\sigma^d$ (nS/m) | $\epsilon'(1\ Hz)^f$ | $\epsilon'(0)^{a,f}$ |
|---|---|---|---|
| NPG | $0.1^c$ | $2^e$ | $2.5^b$ |
| S | 450 | $1,000^f$ | 420,000 |
| Original V$^g$ | 11.0 | 9.7 | 7,800 |
| V Lot 1 | 5.5 | 5.9 | 3,300 |
| V Lot 2 | 8.5 | 8.4 | 7,300 |

[a]sum of relaxation strengths.
[b]estimated from 1 Hz point.
[c]typical value
[d]from fit to loss factor vs. frequency
[e]value for nonpolar hydrocarbon n-dodecane.
[f]from relaxation time fit.
[g]from fit to loss factor and permittivity data only down to 1 Hz Variation in electrical properties between oil lots which are nominally the same, Original Oil V, and Oil V Lots 1 and 2 are attributed to uncontrolled low levels of impurities in the base oil. These impurities were present in such small amount that they could not be identified by NMR spectroscopy measurements on the oils.

Oil formulations containing a variety of different additives were characterized by DEA. The dielectric properties of these oils are listed in Table 2, wherein single point values were obtained at 1 Hz, 50+ C.

TABLE 2

| Additive(s) | Concentration (%) | $\sigma$(nS/m) | $\epsilon'(1\ Hz)$ |
|---|---|---|---|
| vanlube 9317 | 2 | 11.5 | 9.2 |
| Irganox L57 | 1 | 0.2 | 2.8 |
| BHT | 0.7 | 0.2 | 3.1 |
| OAN | 0.1 | 2.0 | 3.1 |
|  | 0.5 | 6.0 | 3.0 |
| BTA | 0.05 | 0.7 | 2.3 |
|  | 0.50 | 0.7 | 2.4 |
| See text, Oil A | 0.1 to 1 | 0.6 | 2.7 |
| See text, Oil B |  | 0.7 | 3.0 |
| See text, Oil C |  | 0.7 | 3.0 |

Low frequency data needed to calculate $\epsilon'(0)$ was not measured for these oils. The specific conductivity and relative permittivity listed in Table 2 are from the DEA data point measured at 1 Hz. Using the loss factor data for the whole range of frequency between about 0.1 and 10,000 Hz, or the single point measured at 1 Hz, provides nearly the same value for the conductivity. For the original Oil V, using all the loss factor data, gives 11.0 nS/m in Table 1, while using only the point value at 1 Hz for the same oil gives 11.5 nS/m in Table 2. The same holds true for the relative permittivity. For the original Oil V, the permittivity from the three-relaxation time curve fit to the relative permittivity data gives 9.7 in Table 1, and the point value for the same oil gives 9.2 in Table 2.

Oligoaniline was among the various additives that were tested. The filtered oil containing this additive was greenish tinted, due to the optical absorbance by the conduction bands of the oligoaniline in its emeraldine form. However, even after filtration, there was still a tendency for sedimentation. When the oil containing OAN was held at 100° C. for several hundred hours, sedimentation and conductivity loss were observed. From NMR spectroscopy, it appeared that the oligoaniline had chemically reacted with the diester base oil.

All of the additives provided some increase in the specific conductivity and conductivity, and the relative permittivity of all remained at least two orders of magnitude lower than that of Oil S.

The dielectric properties of VANLUBE® 9317 in NPG base oil with additive concentration between 0.5 and 4.0 wt % are shown in Table 3. The Amber and Red samples were prepared from one lot of NPG base oil and the Oil V samples were prepared from a different lot of NPG base oil in Table 3. Again, single point values of the relative permittivity were measured at 1 Hz, 50° C.

TABLE 3

| Batch Code | VANLUBE ® 9317 (%) | $\sigma$(nS/m) | $\epsilon'(1\ Hz)$ |
|---|---|---|---|
| Amber | 0.5 | 1.8 | 3.6 |
|  | 1.0 | 2.5 | 3.7 |
|  | 2.0 | 3.0 | 4.2 |
|  | 4.0 | 6.5 | 6.1 |
| Red | 0.5 | 1.6 | 3 |
|  | 1.0 | 2.9 | 4.2 |
|  | 2.0 | 3.6 | 4.5 |
|  | 4.0 | 4.5 | 4.8 |
|  | 2.0 + 0.5% alkylated BTA | 4.8 | 7.0 |
| Oil V | 0.5 | 3.0 | 4.1 |
|  | 1.0 | 2.6 | 3.6 |
|  | 2.0 | 3.9 | 4.4 |
|  | 4.0 | 5.8 | 5.1 |

With a 4-fold increase in concentration, the specific conductivity of VANLUBE® 9317 increased by 3-fold to 4-fold, and the relative permittivity at 1 Hz increased by less than 1.7 times its original value.

Motor Discharge Currents

Typical peak discharge current plots from fluid bearing motors built with three different oils are shown in FIG. 5 (A is NPG, B is Oil V with 2% Vanlube 9317, and C is Oil C). There are three main components of the current: initial transient(s) which decay within 200 to 500 msec, steady state (run) current, and a high frequency noise component. The high frequency noise is probably from the sliding contact between the conductive brush and the spinning motor hub. The steady state current is attributed to charge separation in the oil shear flow. Here only the peak of the discharge current transient, $i_p$ was considered. The steady state running voltage, $v_o$, was also recorded. The steady state running voltage and peak discharge current are listed in Table 4, wherein motor running voltage is $v_o$, running motor peak discharge current is $i_p$, the magnitude of the motor peak discharge conductance is $|i_p/v_o|$, and the specific charge in the oil is $|v_o\epsilon'(0)\epsilon_o|$.

TABLE 4

| Motor RPM | Oil | $v_o$ (mv) | $i_p$ (nA) | $|i_p/v_o|$ (µS) | $|v_o\epsilon'(0)\epsilon_o|$ (C/m) |
|---|---|---|---|---|---|
| 15k | NPG | −280 | 338 | 1.2 | $6.2 \cdot 10^{-12}$ |
| 10k | S | −270 | 1,264 | 4.7 | $1.0 \cdot 10^{-6}$ |
| 15k |  | −230 | 1,378 | 6.0 | $8.5 \cdot 10^{-7}$ |
|  | V (2%) | +140 | 36 | 0.26 | $9.7 \cdot 10^{-9}$ |

| Additives in NPG base oil, 15 kRPM Motors | | | | | |
|---|---|---|---|---|---|
| Additive(s) | Concentration % | $v_o$ (mv) | $i_p$ (nA) | $|i_p/v_o|$ (µS) | $|v_o\epsilon'(0)\epsilon_o|$ (C/m) |
| Irganox L57 | 1 | −220 | 43 | 0.20 | Low |
| BHT | 0.7 | −100 | 32 | 0.32 | frequency |
| OAN | 0.1 | −150 | 34 | 0.23 | measured |
|  | 0.5 | −400 | 112 | 0.28 |  |
| BTA | 0.05 | −190 | 41 | 0.22 |  |
|  | 0.50 | −280 | 55 | 0.2 |  |
| See text, Oil A | 0.1 to 1 | −111 | 215 | 1.95 |  |
| See text, Oil B |  | −80 | 18 | 0.23 |  |
| See text, Oil C |  | −330 | 81 | 0.25 |  |
| Vanlube 9317 | 0.5 | +8 | 8 | 1.0 |  |
| (Oil V, Red | 1.0 | +167 | 35 | 0.21 |  |
| Batch) | 2.0 | +268 | 57 | 0.21 |  |
|  | 4.0 | +212 | 45 | 0.21 |  |
|  | 2.0 + 0.5% BTA | +49 | 15 | 0.31 |  |

The voltage on a running motor was between −400 and +140 mV with the various additives. The running voltage polarity was negative (with respect to the stator) except for the motors built with Oil V, in which case the polarity was positive. Notably, the motor voltage was not dependent completely on oil conductivity and permittivity. In contrast, the peak discharge current exhibited a strong dependence on the additive formulation. By far, the highest peak discharge current was with the Oil S formulation. There appears to be a relationship between the peak discharge current in Table 4 and the specific conductivity of the oil in Table 3.

Principles of Application

Figure 6:
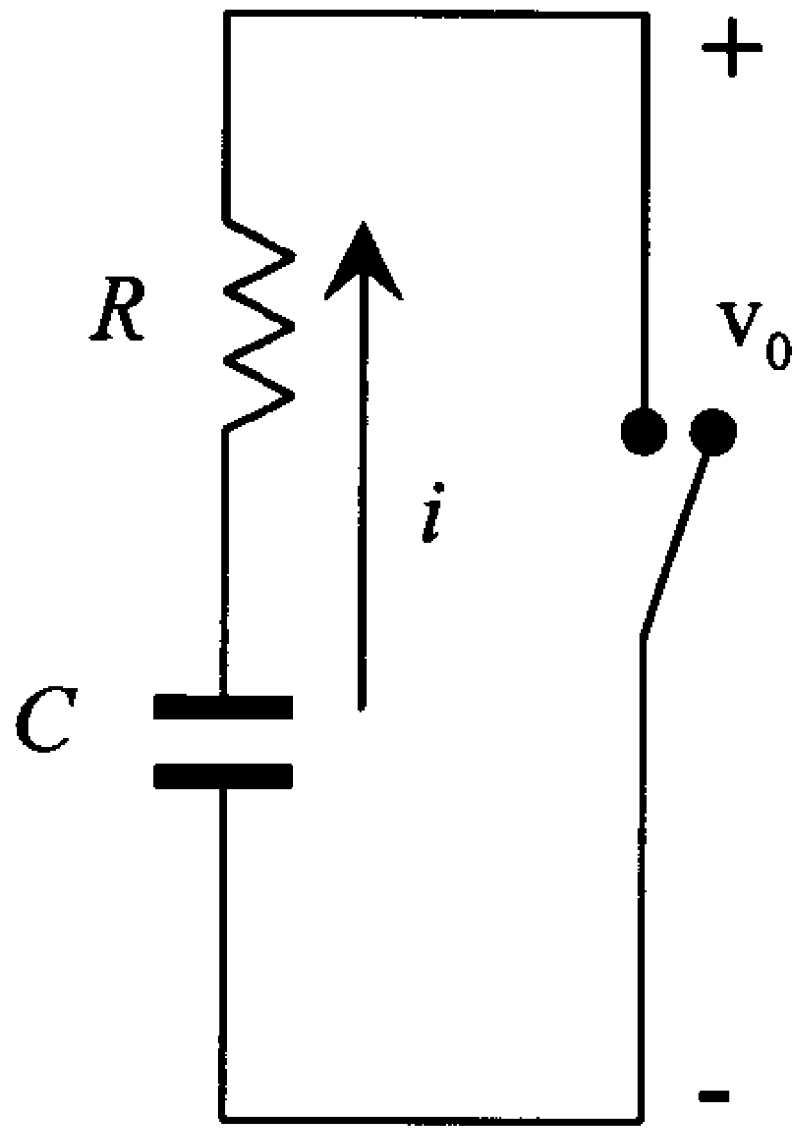
FIG. 6 depicts a series RC equivalent circuit model for the motor discharge transient, wherein the switch is suddenly closed at $t=0$ with intial $v=v_o$.

A model was developed for relating the oil dielectric properties to the peak discharge current. An RC equivalent circuit, which is a reasonable first approximation to describe electrical discharge phenomenon, is shown in FIG. 6. The motor self charges to a voltage $v_o$, which is present until there is a short circuit between the rotor and the stator, as in the peak discharge current measurement. The transient current following the switch closing is:

$$i(t) = \frac{v_o}{R} e^{-t/RC},$$

where R is the spindle resistance, C is the spindle capacitance, and t is time. The total electric charge and energy in the fluid bearing oil is proportional to the dc relative permittivity, $\epsilon'(0)$ according to:

electric charge=$v_o C = K v_o \epsilon'(0) \epsilon_o$, and electric energy=$\tfrac{1}{2} v_o^2 C = \tfrac{1}{2} K v_o^2 \epsilon'(0) \epsilon_o$, where $\epsilon_o = 8.85 \times 10^{-12}$ F/m is the absolute permittivity of free space, and K is a proportionality constant. The peak discharge current, $i_p$, is proportional to the oil specific conductivity, σ:

peak discharge current=$i_p = v_o/R = K v_o \sigma$.

From the RC model, it follows that the magnitude (absolute value) of the peak discharge current ratio to the motor voltage, $|i_p/v_o|$, is proportional to the oil specific conductivity. In other words, charge stored in the bulk of the oil will discharge more quickly through oil that has a higher conductivity. Hence, a log-log plot of $|i_p/v_o|$ vs. σ is ideally a straight line with slope 1.

The peak discharge current is compared with the dielectric properties of the oil below. From the RC model above, the absolute value of the ratio of the peak discharge current to the motor voltage is proportional to the oil conductivity, and is independent of the electric charge. The quantity, $|i_p/v_o|$, is referred to here as the peak discharge conductance. The peak discharge conductance for motors built with the various oil formulations is listed in Table 4. A log-log plot of the peak discharge conductance vs. oil conductivity is shown in FIG. 7. The proportionality expected from the RC model is shown by the straight line, which was fit through the Oil S data point. Deviation from the proportional response increased with decreasing specific conductivity. The peak discharge conductance increased at low conductivity for the NPG base oil, while it leveled off for the other oils with conductivity below Oil V (except for the Oil A, which had an unusually high peak discharge current, and Red Batch 0.5% which had an unusually low motor voltage).

The smooth curve sketched in FIG. 7 shows what seems to be a tendency for the peak discharge conductance to have a minimum near 8 nS/m. This could be explained as follows. For specific conductivities higher than about 10 nS/m, the peak discharge conductance is controlled by the bulk charge storage and dissipation through the bulk of the oil. The deviation from the RC model curve increases as the conductivity decreases below 10 nS/m, and the peak discharge current even increased for the very low conductivity NPG base oil. This type of deviation suggests that there is another charge/discharge mechanism, which increases in importance relative to that described by the RC model, in the limit of low conductivity. It may be that an electrostatic charge develops on the motor hub with low conductivity oils due to air shear. Dissipation of the electrostatic charge is then only through the external circuit, rather than through the bulk of the oil, so the discharge does not track with the bulk oil conductivity. Aside from the details of the mechanism, the smooth curve with the minimum in FIG. 7 suggests that there is a shallow minimum in the peak discharge conductance with an oil specific conductance between 2 and 20 nS/m.

For high conductivity oil, the peak discharge conductance is given by:

$$\left|\frac{i_p}{v_0}\right| = \left(\frac{A}{d}\right)\sigma,$$

where the geometry factor A/d is the ratio of the area A to the plate separation d of the equivalent parallel plate capacitor. From the RC model fit to the Oil S motor data point (solid line in FIG. 7), A/d=13.3 m. The geometry factor of the equivalent parallel plate capacitor will differ somewhat from the actual fluid bearing. This is because the actual fluid bearing has cylindrical and parallel disk, or conical, regions which provide radial and axial stiffness. The equivalent geometry factor A/d is employed to calculate the fluid bearing resistance $R=1/(\sigma(A/d))$, and the capacitance $C=\epsilon'(0)\epsilon_o(A/d)$. For the fluid bearing motors built with type V oils (Table 1): $6.8<R<13.7$ MΩ and $0.38<C<0.94$ μF. Motors built with the Red Batch oils (Table 3) had $1.7<R<13.5$ MΩ.

The electric charge in the oil and the oil conductivity likely originated from the same charge carriers in the oil. The power law slope of the specific charge in the fluid bearing $|v_{o\epsilon}'(0)\epsilon_o|$ versus specific conductivity is 1.4. This suggests the following approximate relationship for the specific charge in the bearing: $|v_{o\epsilon}'(0)\epsilon_o|=K\sigma^{3/2}$. The power law slope of 3/2 is consistent with a volume to surface area mapping, as if bulk charge carriers accumulate at the electrode (rotor and stator) surfaces.

Although they are generally independent from one another, the relative permittivity does appear to increase nearly linearly with the specific conductivity. From the linear regression fit of the relative permittivity versus the specific conductivity for a variety of separately prepared samples, and different concentrations, of VANLUBE® 9317 in NPG base oil, $\epsilon'(1\ Hz)=2.5+0.5\ \sigma$, with σ in nS/m.

Some of the samples were held in an oven at 100° C. for various amounts of time up to 1,400 hours, which slightly increased the conductivity and permittivity.

Prevention of Spark Erosion Damage

One possibility is that the peak discharge current, measured just after grounding the spinning motor hub to the stator, could flow through the carbon overcoat in an asperity contact between the magnetic recording slider and the disk. This did not take into account the asperity contact resistance. The asperity contact resistance is $Rc=2/(\sigma_c(A_c/l_c))$, where the factor of 2 accounts for the resistance of the head overcoat, which is assumed to be the same thickness and conductivity as the disk overcoat. With typical values of $\sigma_c\approx10^{-10}$ S/m, $A_c\approx10^{-12}$ m$^2$, and $l_c\approx5\times10^{-9}$ m, then $R_c\approx10^{17}$ Ω. Consequently, electric current flow through the overcoat in an asperity contact is negligibly small.

Magnetic recording disk surfaces occasionally exhibit isolated defect sites, which appear to be the result of local melting and vaporization. Magnetic recording sliders sometimes show pitting removal of ceramic occlusions as particles from the ceramic slider body, usually near the trailing edges and corners. These particles are often found embedded near scratches in the disk overcoat and magnetic layers. From time to time in the disk drive industry, motor charging is considered as a contributing factor in the formation of such defects. The most likely explanation for these defects is particulate contamination during disk drive component manufacturing and assembly.

It may be possible that some of these defects could be formed during electric arc discharge across the air gap between the magnetic recording disk and slider. Briefly stated, at some critical electric field, emitted electrons begin to ionize material that is evaporating from the cathode, forming highly conductive plasma. This electric arc, which can be as short-lived as a nanosecond, leaves molten debris and craters on the cathode.

Nitrogenated carbon overcoats on magnetic recording disks typically contain 10 to 15 atm % nitrogen. The critical electric field for similar nitrogenated carbon films is 12 to $17\times10^6$ V/m, for arcing to a steel ball in a vacuum. For a slider flying at 10 nm, the range of critical voltage would then be 120 to 170 mV. This is within the range of motor running voltages measured for motors built with the various oil formulations listed in Table 4. Increased pressure, which forms the air bearing between the disk and slider, could increase the critical voltage. Because the gap between the slider and the disk surfaces is less than the mean free path of air, ions will probably collide with one of the surfaces before colliding with another gas molecule even at ambient pressure. Both the slider and disk surfaces are carbon overcoated rather than one surface being overcoated and the other stainless steel as in the vacuum arc discharge measurements. Since the plasma for the arc is generated by ionization of moieties being desorbed from the surface by electrons, arcing should be sensitive to the type of disk lubricant, surface layer composition, adsorbates, and other types of contaminants.

The critical electric field for discharge increases with decreasing conductivity of nitrogenated carbon, probably because there are fewer electrons available for emission to initiate the arc. In addition, the site of the cratering could be on either the slider or the disk surface, depending on the polarity $v_o$.

Conditions for arc discharge between the disk and slider could potentially exist for most of the oil formulations listed in Table 4. If the fluid bearing fully discharges in the arc, the maximum adiabatic temperature rise, ΔT, in a volume of surface material, V, is:

$$\Delta T = \frac{1}{2}\frac{v_0^2 C}{C_p V},$$

where $v_o^2 C/2$ is the electric energy in the bearing, and $C_p$ is the heat capacity of the surface material. The actual temperature rise will be significantly less than the maximum, because the asperity contact does not last long enough to dissipate all of the electric charge. Since $C_p$ and V are unknown, ΔT cannot be quantitatively predicted. However, ΔT is expected to increase along with the total electric energy. The total electric energy in the fluid bearing, $v_o^2 C/2 = v_o^2 \epsilon'(0)\epsilon_o(A/d)/2$ may be plotted as a function of specific conductivity. In the limit of low σ, $v_o^2 C/2$ approaches proportionality to $\sigma^2$, and in the limit of high σ, $v_o^2 C/2$ approaches direct proportionality to σ. As with the two regions seen in the dependence of $|i_p/v_o|$ on σ, this change in the functional dependence on σ indicates a transition between primarily electrostatic surface charge in the limit of low conductivity, to bulk charge in the high conductivity limit.

In short, the experimental data provided above indicates that the peak discharge conductance has a minimum near a specific conductivity of 8 nS/m. This may be accounted for by a transition from primarily electrostatic surface charge with very low conductivity oils to bulk charge in the higher conductivity oils. The electric charge increased with specific conductivity to the 1.4 power. Relative permittivity measured at 1 Hz increased nearly linearly with specific conductivity for a wide range of oils.

The electrical resistance of asperity contacts is so large that negligible charge could flow by this pathway. However, the electric field across the air bearing of low flying sliders over the range of observed motor running voltage is close to the critical field for electric arc discharge from nitrogenated carbon overcoats. Sufficiently energetic arc discharge could lead to pitting and debris generation. Thus, it should be evident that the optimal additive for control in fluid bearing motors provides sufficient conductivity to dissipate electrostatic charge with the least possible amount of electric energy stored in the fluid bearing.

Variations on the present invention will be apparent to those of ordinary skill in the art. For example, although soluble additives as discussed above may be included in the lubricant, partially soluble and insoluble additives may be employed as well in some instances. For example, highly conductive multiwall carbon nanotubes may be used as a conductivity-enhancing lubricant as slong as the nanotubes are sufficiently dispersed so as to avoid sedimentation.

It is to be understood that while the invention has been described in conjunction with the preferred specific embodiments thereof, the foregoing description is intended to illustrate and not limit the scope of the invention. Other aspects, advantages and modifications will be apparent to those skilled in the art to which the invention pertains.

All patents, patent applications, and publications cited herein are incorporated by reference in their entireties.

We claim:

1. A disk drive system comprising:
   a rotatably mounted magnetic disk;
   a rotor coupled to the magnetic disk;
   a stator for rotatably retaining the rotor;
   a bearing that serves as an interface between the stator and the rotor, wherein the bearing is selected from a journal bearing, a thrust bearing, a spiral groove bearing, a herringbone groove bearing, or wherein the bearing is formed from surfaces that are embossed with grooves to create an internal pressure within a lubricant;
   a motor coupled to the rotor for rotating the magnetic disk via the rotor; and
   the lubricant disposed in the bearing, wherein the lubricant is comprised of a lubricating medium and a charge-control additive for reducing charge accumulation in the bearing, and wherein the charge-control additive is comprised of dioctyldiphenylamine, an oligomer comprising dioctyldiphenylamine, or a combination of the foregoing.

2. The disk drive system of claim 1, comprising a plurality of rotatably mounted and spaced-apart magnetic disks mounted on the rotor, such that the motor rotates the magnetic disks via the rotor.

3. The disk drive system of claim 1, wherein the motor is constructed to rotate the rotor at a rate greater than 3,500 revolutions per minute.

4. The disk drive system of claim 1, wherein the bearing is a journal bearing.

5. The disk drive system of claim 1, wherein the bearing is a thrust bearing.

6. The disk drive system of claim 1, wherein the bearing is a spiral groove bearing.

7. The disk drive system of claim 1, wherein the bearing is a herringbone groove bearing.

8. The disk drive system of claim 1, wherein the bearing is formed from surfaces that are embossed with grooves to create an internal pressure within the lubricant.

9. The disk drive system of claim 1, wherein the lubricating medium is comprised of an oil.

10. The disk drive system of claim 1, wherein the charge-control additive is solubilized or dissolved in the lubricating medium.

11. The disk drive system of claim 1, wherein the charge-control additive further comprises phenylnaphthylamine, an oligomer thereof, or a combination of the forgoing.

12. The disk drive system of claim 1, wherein the charge-control additive is comprised of an oligomer of phenylnaphthylamine and dioctyldiphenylamine.

13. The disk drive system of claim 1, wherein the lubricant is further comprised of a conductivity-enhancing additive for enhancing the electrical conductivity of the lubricant.

14. The disk drive system of claim 13, wherein the conductivity-enhancing additive is solubilized or dissolved in the lubricating medium.

15. The disk drive system of claim 13, wherein the conductivity-enhancing additive is comprised of an aniline, an oligomer thereof, a polymer thereof, or a combination of the forgoing.

* * * * *